(12) United States Patent
Holoch et al.

(10) Patent No.: US 11,725,842 B2
(45) Date of Patent: Aug. 15, 2023

(54) FLOW CONTROL DEVICE FOR AN HVAC FLUID TRANSPORTATION SYSTEM

(71) Applicant: BELIMO HOLDING AG, Hinwil (CH)

(72) Inventors: Philip Holoch, Neschwil (CH); Daniel Hauser, Pfäffikon (CH); Benjamin Schönenberger, Oetwil am See (CH); Pasquale Wintsch, Russikon (CH); Michael Hediger, Jona (CH); Silvio Grogg, Wetzikon (CH); Peter Schmidlin, Uster (CH)

(73) Assignee: BELIMO HOLDING AG, Hinwil (CH)

( * ) Notice: Subject to any disclaimer, the term of this patent is extended or adjusted under 35 U.S.C. 154(b) by 124 days.

(21) Appl. No.: 16/968,395

(22) PCT Filed: Mar. 25, 2019

(86) PCT No.: PCT/EP2019/057445
§ 371 (c)(1),
(2) Date: Aug. 7, 2020

(87) PCT Pub. No.: WO2019/206541
PCT Pub. Date: Oct. 31, 2019

(65) Prior Publication Data
US 2020/0400341 A1  Dec. 24, 2020

(30) Foreign Application Priority Data
Apr. 24, 2018  (CH) .................................... 00525/18

(51) Int. Cl.
*F24F 11/00* (2018.01)
*G01F 1/60* (2006.01)
(Continued)

(52) U.S. Cl.
CPC .............. *F24F 11/88* (2018.01); *F24F 11/84* (2018.01); *G01F 1/662* (2013.01); *G05D 7/0635* (2013.01);
(Continued)

(58) Field of Classification Search
CPC .. F24F 11/84; F24F 11/88; G06F 1/66; G05D 7/0635
See application file for complete search history.

(56) References Cited

U.S. PATENT DOCUMENTS 6,219,590 B1   4/2001  Bernaden, III et al.
6,430,985 B1   8/2002  Drees
(Continued)

FOREIGN PATENT DOCUMENTS

CN   201348338 Y   11/2009
CN   201555331 U    8/2010
(Continued)

OTHER PUBLICATIONS

International Search Report for PCT/EP2019/057445 dated Jun. 11, 2019 [PCT/ISA/210].
(Continued)

*Primary Examiner* — Mark A Connolly
(74) *Attorney, Agent, or Firm* — Sughrue Mion, PLLC

(57) ABSTRACT

A flow control device (1) for an HVAC fluid transportation system comprises a flow tube (10) formed in one piece, a flow measurement system (11) integrated with the flow tube (10) and configured to measure a volumetric flow of fluid (φ) through the flow tube (10), and an electronic circuit (12) arranged in a fixed fashion on the flow tube (10) and connected electrically to the flow measurement system (11). The flow control device (1) further comprises a control signal output terminal (13) attached to the flow tube (10) and connected to the electronic circuit (12). The electronic
(Continued)

circuit (12) is configured to generate and apply on the control signal output terminal (13) an actuator control signal, using the volumetric flow of fluid ($\phi$) measured by the flow measurement system (11), for an actuator actuating a valve of the HVAC fluid transportation system (2) arranged outside the flow tube (10) of the flow control device (1).

13 Claims, 1 Drawing Sheet

(51) Int. Cl.
*F24F 11/88* (2018.01)
*F24F 11/84* (2018.01)
*G01F 1/66* (2022.01)
*G05D 7/06* (2006.01)
*F24F 110/70* (2018.01)
*F24F 110/72* (2018.01)
*F24F 130/10* (2018.01)
*F24F 110/10* (2018.01)
*F24F 11/58* (2018.01)

(52) U.S. Cl.
CPC ........... *F24F 11/58* (2018.01); *F24F 2110/10* (2018.01); *F24F 2110/70* (2018.01); *F24F 2110/72* (2018.01); *F24F 2130/10* (2018.01)

(56) References Cited

U.S. PATENT DOCUMENTS

| | | | |
|---|---|---|---|
| 7,360,448 B2* | 4/2008 | Maginnis | G01F 1/662 |
| | | | 73/861.27 |
| 2016/0313751 A1* | 10/2016 | Risbeck | G05B 15/02 |

FOREIGN PATENT DOCUMENTS

| | | |
|---|---|---|
| EP | 2 896 899 A1 | 7/2015 |
| WO | 2009/156010 A1 | 12/2009 |
| WO | 2010/122117 A1 | 10/2010 |
| WO | 2015/154777 A1 | 10/2015 |
| WO | 2017/050588 A1 | 3/2017 |
| WO | 2017/207634 A1 | 12/2017 |

OTHER PUBLICATIONS

Written Opinion for PCT/EP2019/057445 dated Jun. 11, 2019 [PCT/ISA/237].
Swiss Search Report for CH 5252018 dated Jul. 30, 2018.

* cited by examiner

FLOW CONTROL DEVICE FOR AN HVAC FLUID TRANSPORTATION SYSTEM

CROSS REFERENCE TO RELATED APPLICATIONS

This application is a National Stage of International Application No. PCT/EP2019/057445 filed Mar. 25, 2019, claiming priority based on Swiss Patent Application No. 00525/18 filed Apr. 24, 2018.

FIELD OF THE INVENTION

The present invention relates to a flow control device for an HVAC (Heating, Ventilating, Air Conditioning and Cooling) fluid transportation system. Specifically, the present invention relates to a flow control device comprising a flow tube formed in one piece, and a flow measurement system integrated with the flow tube and configured to measure a volumetric flow of fluid through the flow tube, and an electronic circuit arranged in a fixed fashion on the flow tube and connected electrically to the flow measurement system.

BACKGROUND OF THE INVENTION

For HVAC heating and cooling applications, flow sensors or flow meters are used in connection with monitoring and controlling the hydronic performance of an HVAC system, e.g. for measuring and controlling the volumetric flow of fluid through heat exchangers or cooling devices. The applicant manufactures and offers ultrasonic flow meters which comprise a flow tube and an ultrasonic flow measurement system integrated with the flow tube. Specifically, the flow measurement system comprises a pair of acoustic transceivers (emitters/receivers) and acoustic mirrors which are integrated with the flow tube and configured to transmit and receive ultrasound to and from a measurement path arranged inside the flow tube. The ultrasonic flow measurement system further comprises an electronic circuit connected to the acoustic transceivers and configured to calculate the flow rate of the volumetric flow of fluid through the flow tube from ultrasonic transit times on the measurement path. The electronic circuit generates an electronic signal indicating to external devices the measured flow of fluid via a wire connection. Typically, in existing installations and configurations of HVAC systems, the output signal from a flow sensor is feed to a building control system which generates setpoint values for adjustable control valves, based on the measured flow of fluid and further measurement values, e.g. room temperature, provided to the building control system by respective sensors.

SUMMARY OF THE INVENTION

It is an object of this invention to provide a flow control device for an HVAC fluid transportation system, which flow control device does not have at least some of the disadvantages of the prior art. In particular, it is an object of the present invention to provide a flow control device which makes it possible to provide HVAC installations efficiently and flexibly with flow-dependent control of actuated valves.

According to the present invention, these objects are achieved through the features of the independent claims. In addition, further advantageous embodiments follow from the dependent claims and the description.

A flow control device for an HVAC fluid transportation system comprises a flow tube (pipe) formed in one piece, a flow measurement system integrated with the flow tube and configured to measure a volumetric flow of fluid through the flow tube, and an electronic circuit arranged in a fixed fashion on the flow tube and connected electrically to the flow measurement system.

According to the present invention, the above-mentioned objects are particularly achieved in that the flow control device further comprises a control signal output terminal attached to the flow tube and connected to the electronic circuit. The electronic circuit is configured to generate and apply on the control signal output terminal an actuator control signal, using the volumetric flow of fluid measured by the flow measurement system, for an actuator, arranged outside the flow tube of the flow control device, to actuate a valve of the HVAC fluid transportation system. Providing the flow measurement system with a control signal output terminal and an electronic circuit for generating and applying on the control signal output terminal an actuator control signal makes it possible for the flow control device to autonomously control a valve of the HVAC fluid transportation system, without having to rely on control functions of a separate building control system. Moreover, existing installations of HVAC systems may be conveniently and efficiently retrofit with autonomous control functions by simply inserting the flow control device fluidically into the HVAC fluid transportation system and connecting the control signal output terminal to the actuator of a valve present in the existing installation of an HVAC system.

Providing a flow control device with a control signal output terminal and applying on the control signal output terminal an actuator control signal, has the advantage that the flow control device can be connected flexibly to any type of controllable actuator for controlling performance of the actuator, without any significant delay between the time of flow measurement and the time of actual control of an external actuator.

In an embodiment, the flow control device further comprises a communication module attached to the flow tube and connected to the electronic circuit, and the electronic circuit is configured to generate the actuator control signal further using a control command received by the communication module via a communication network. The communication module makes it possible for the flow control device to generate the actuator control signal using control commands from a building control system, for example.

In an embodiment, the communication module is configured to receive one or more control parameters via the communication network from a cloud-based computer system, and the electronic circuit is configured to generate the actuator control signal further using the one or more control parameters received from the cloud-based computer system. Configuring the communication module to receive control parameters from a cloud-based computer system makes it possible for the flow control device to generate the actuator control signal using control parameters which are not available locally at the site of the respective HVAC system.

In an embodiment, the communication module is configured to receive with the one or more control parameters from the cloud-based computer system meteorological weather data, energy pricing information, room temperature information, and/or energy resource availability data; and the electronic circuit is further configured to generate the actuator control signal further using respectively the meteorological weather data, the energy pricing information, the room temperature information, and/or the energy resource availability data received from the cloud-based computer system.

In an embodiment, the communication module is configured to transmit to the cloud-based computer system one or more operational HVAC data values, including the volumetric flow of fluid measured by the flow measurement system, an air temperature value, an air humidity value, a carbon dioxide value, a carbon monoxide value, a fluid temperature, motor activity data, and/or valve activity data. Configuring the communication module to transmit operational HVAC data values to the cloud-based computer system makes it possible for the flow control device to monitor and analyze the performance of a plurality of HVAC fluid transportation systems and/or actuators, enabling performance improvement based on analytic results.

In an embodiment, the flow control device further comprises one or more sensor signal input terminals attached to the flow tube and connected to the electronic circuit, and the electronic circuit is further configured to generate the actuator control signal further using one or more sensor values received on the one or more sensor signal input terminals. Providing the flow control device with sensor signal input terminals makes it possible for the flow control device to generate the actuator control signal using sensor values which are available locally at the site of the respective HVAC system.

In an embodiment, the one or more sensor signal input terminals include an air temperature sensor input terminal, an air humidity sensor input terminal, a carbon dioxide sensor input terminal, a carbon monoxide sensor input terminal, and/or a fluid temperature sensor input terminal; and the electronic circuit is further configured to generate the actuator control signal further using respectively an air temperature value, an air humidity value, a carbon dioxide value, a carbon monoxide value, and/or a fluid temperature received on the one or more sensor signal input terminals.

In an embodiment, the flow control device further comprises an actuator data input terminal attached to the flow tube and connected to the electronic circuit, and the electronic circuit is further configured to generate the actuator control signal further using actuator data received on the actuator data input terminal.

In an embodiment, the electronic circuit is configured to determine an actuator type from an actuator identifier received on the actuator data input terminal, and to generate the actuator control signal using the actuator type. Configuring the electronic circuit to generate the actuator control signal depending on the actuator type makes it possible to flexibly operate the flow control device with different types of controllable actuators which require different control signals.

In an embodiment, the electronic circuit is configured to generate the actuator control signal using the volumetric flow of fluid measured by the flow measurement system such as to maintain a set target value for the volumetric flow of fluid.

In an embodiment, the flow measurement system comprises one or more pairs of ultrasound transceivers integrated into a wall of the flow tube and configured to transmit and receive ultrasound to and from a measurement path inside the flow tube.

In an embodiment, the flow control device further comprises a data communication bus connecting at least one terminal receiver to the electronic circuit, the at least one terminal receiver being configured to receive and removably attach an auxiliary sensor signal input terminal to the flow tube and connecting the auxiliary sensor signal input terminal to the electronic circuit, and the electronic circuit is configured to generate the actuator control signal further using one or more sensor values received on the an auxiliary sensor signal input terminal. Providing the flow control device with a terminal receiver makes it possible to flexibly connect and disconnect different sensor signal input terminals, as needed.

In an embodiment, the electronic circuit is configured to generate the actuator control signal to indicate a motor position, a motor movement direction, a valve position, and/or a degree of opening of a valve orifice.

In an embodiment, the control signal output terminal comprises an antenna configured to wirelessly transmit the actuator control signal to the actuator, and a connector configured to set up a wired connection for applying the actuator control signal to the actuator.

In an embodiment, the flow control device further comprises an antenna configured to receive electromagnetic energy from an external mobile device for powering the electronic circuit and the flow measurement system. Having an antenna configured to power the electronic circuit and the flow measurement system with electromagnetic energy transmitted by an external mobile device, enables the flow control device to measure the volumetric flow of fluid through the flow tube, and to generate and apply on the control signal output terminal an actuator control signal, without requiring a wire connection to a power supply.

BRIEF DESCRIPTION OF THE DRAWINGS

The present invention will be explained in more detail, by way of example, with reference to the drawings in which.

DETAILED DESCRIPTION OF THE PREFERRED EMBODIMENTS

Figure 1:
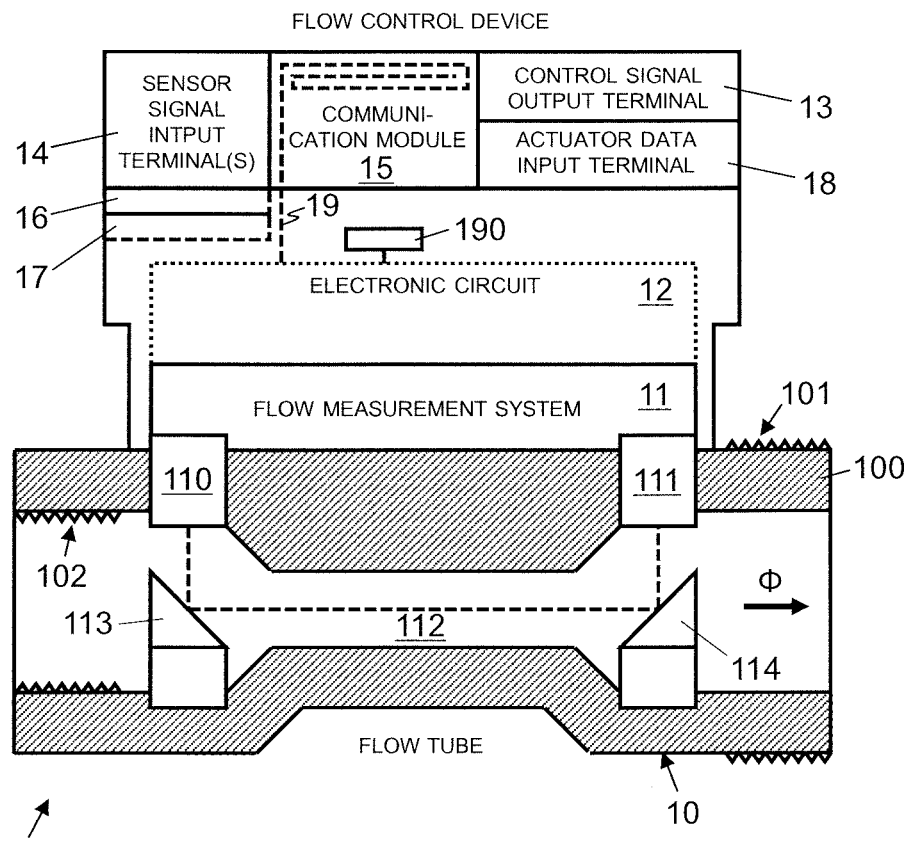
FIG. 1: shows a block diagram of a flow control device, illustrating schematically a cross section of a flow tube with an integral flow measurement system, an electronic circuit connected to the flow measurement system, and a control signal output terminal connected to the electronic circuit.
Figure 2:
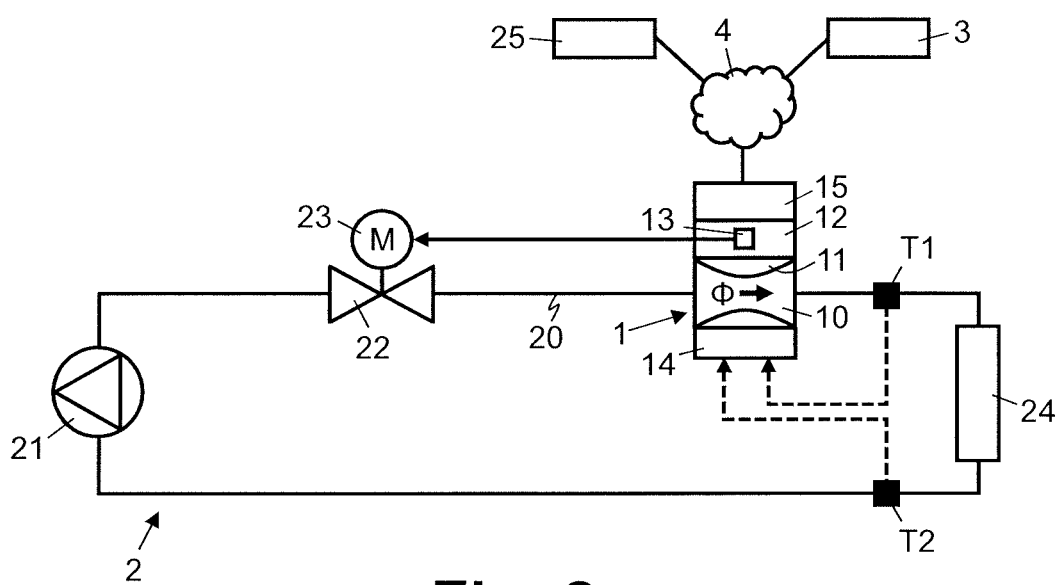
FIG. 2: shows a block diagram of an HVAC system, illustrating schematically an HVAC fluid transportation system with a flow control device having a flow tube, arranged in the HVAC fluid transportation system, an integral flow measurement system, and a control signal output terminal connected to an actuated valve of the HVAC fluid transportation system.

In FIGS. 1 and 2, reference numeral 1 refers to a flow control device for an HVAC fluid no transportation system 2.

FIG. 2 shows an HVAC fluid transportation system 2 which comprises a fluid driver 21, e.g. a motorized pump or ventilator, a regulating valve 22 actuated by an actuator 23, and a thermal energy exchanger 24, e.g. a heat exchanger or a cooling device, interconnected by fluid transportation lines 20, e.g. pipes or ducts.

As illustrated in FIGS. 1 and 2, the flow control device 2 comprises a flow tube 10. The flow tube 10 is formed in one piece, e.g. from cast iron, and embodies a pipe which can be integrated into the HVAC fluid transportation system 2 such that the fluid moving or circulating in the HVAC fluid transportation system 2 moves or flows through the flow tube 10. The flow tube 10 comprises a wall 100 with interior and exterior threads 101, 102 for connecting the flow tube 10 to pipes of the HVAC fluid transportation system 2.

The flow control device 2 comprises a flow measurement system 11 integrated with the flow tube 10. In an embodiment, the flow measurement system 11 includes an ultrasonic flow sensor comprising one or more pairs of ultrasound transceivers 110, 111 and acoustic mirrors 113, 114. The ultrasound transceivers 110, 111 are integrated into the wall 100 of the flow tube 10. The ultrasound transceivers 110, 111 are configured to transmit and receive ultrasound to and from a measurement path 112 arranged inside the flow tube 10. As illustrated in FIG. 2, the measurement path 112 extends from one of the ultrasound transceivers 110, 111 (of a pair) via the acoustic mirrors 113, 114 to the other one of the ultrasound transceivers 110, 111 (of the respective pair). The flow measurement system 11 is configured to determine the volumetric flow of fluid $\phi$ through the flow tube 10 based on measured transit times of the ultrasound on the measurement path 112, in both directions between the ultrasound transceivers 110, 111 of a respective pair. For calculating the volumetric flow of fluid $\phi$ the flow measurement system 11 comprises an electronic circuit connected to the ultrasound transceivers 110, 111.

As illustrated in FIGS. 1 and 2, the flow control device 2 comprises an electronic circuit 12 attached to the flow tube 10. As indicated by the dotted line in FIG. 2, in an embodiment, the electronic circuit 12 is part of the flow measurement system 11. Otherwise, the electronic circuit 12 is electrically connected to the flow measurement system 11. Depending on the embodiment, the electronic circuit 12 comprises a programmable processor, an application specific integrated circuit (ASIC), or another logic unit.

The flow control device 2 comprises a control signal output terminal 13 attached to the flow tube 10 and connected to the electronic circuit 12. The electronic circuit 12 is configured to generate and apply on the control signal output terminal 13 an actuator control signal, using the volumetric flow of fluid $\phi$ determined by the flow measurement system 11. The actuator control signal is generated to control the actuator 23 actuating the valve 22 such as to regulate the flow of fluid $\phi$ in the HVAC fluid transportation system 2 depending on the measured flow of fluid $\phi$. For example, the electronic circuit 12 generates the actuator control signal based on the measured flow $\phi$ such as to maintain a set target flow, e.g. stored in the electronic circuit 12, regardless of pressure variations. Depending on the configuration, the actuator control signal indicates and defines for the actuator 23 a motor position, a motor movement direction, a motor speed, a valve position for the valve 22, and/or a degree of opening of the valve orifice of the valve 22. The control signal output terminal 13 comprises an antenna for wirelessly transmitting the actuator control signal to the actuator 23 and/or an electrical or optical connector for setting up a wired connection to apply the actuator control signal to the actuator 23.

As illustrated in FIGS. 1 and 2, the flow control device 2 comprises a communication module 15 attached to the flow tube 10 and connected to the electronic circuit 12. The communication module is configured for data communication via a communication network 4, e.g. with a building control system 25, located at the site of the HVAC fluid transportation system 2, or a remote cloud-based computer system 3. Depending on the embodiment, the communication network 4 comprises a local area network (LAN), a wireless local area network (WLAN), a mobile radio network, such as GSM (Global System for Mobile Communication) or UMTS (Universal Mobile Telephone System), and/or the Internet. The building control system 25 and the cloud-based computer system 3, respectively, comprise one or more networked computers with one or more processors per computer.

As illustrated schematically in FIG. 1, in an embodiment, the flow control device 1 comprises an antenna 19, e.g. as part of the communication module 15, which is connected to the electronic circuit 12 and configured to receive electromagnetic energy from an external mobile device for powering the electronic circuit 12 and the flow measurement system 11. For example, the mobile device is a mobile phone or another electronic device including an RFID (Radio Frequency Identifier) or NFC (Near Field Communication) module for wirelessly powering the flow control device 1 (per induction). In an embodiment, the flow control device 1 comprises an energy storage 190, e.g. a battery or a supercap, for example a lithium-ion capacitor (LIC), which is connected to the electronic circuit 12 and the flow measurement system 11 for powering the electronic circuit 12 and the flow measurement system 11. Depending on the embodiment, the energy storage 190 is charged by the mobile device, wirelessly via antenna 19, or by a power supply, through a wire connection. The energy storage is connected to the electronic circuit 12 and the flow measurement system 11 via a switch which is activated, for example, by an external device through an RFID or NFC interface.

The electronic circuit 12 is configured to generate the actuator control signal further using data received by the communication module 15 via the communication network 4 from the building control system 25 and/or the cloud-based computer system 3. Depending on the embodiment and/or application, the data includes control commands and/or control parameters from the building control system 25 and/or the cloud-based computer system 3. The control commands include a target room temperature, a maximum amount of energy to be used, a maximum power level to be used, and/or other command data for the electronic circuit 12 to generate the actuator control signal. The control parameters include meteorological weather data, energy pricing information, room temperature information, energy resource availability data, and/or other control data for the electronic circuit 12 to generate the actuator control signal.

As illustrated in FIGS. 1 and 2, the flow control device 2 further comprises an actuator data input terminal 18 attached to the flow tube 10 and connected to the electronic circuit 12. The actuator data input terminal 18 comprises an antenna for wirelessly receiving and/or an electrical or optical connector for receiving through a wired connection actuator data from the actuator 23. The actuator data includes an actuator identifier indicating the type and (serial) number of the actuator 23, and/or operational data of the actuator 23, such as number of movements, number of directional changes, idle time, and time of operation of the actuator 23. The electronic circuit 12 is configured to generate the actuator control signal further using actuator data received on the actuator data input terminal 18. For example, the electronic circuit 12 generates the actuator control signal with different coding and/or voltage levels, depending on the type of the actuator 23.

As illustrated in FIGS. 1 and 2, the flow control device 2 further comprises one or more sensor signal input terminals 14 attached to the flow tube 10 and connected to the electronic circuit 12. In an embodiment, for added flexibility and configurability, the flow control device 1 further comprises a data communication bus 17 connecting one or more terminal receivers 16 to the electronic circuit 12. The terminal receivers 16 are configured to receive and removably attach an auxiliary sensor signal input terminal 14 to the flow tube 10 and to connect the auxiliary sensor signal input terminal 14 to the electronic circuit 12. Depending on the embodiment and configuration, the fixed or removable sensor signal input terminals 14 include an air temperature sensor input terminal, an air humidity sensor input terminal, a carbon dioxide sensor input terminal, a carbon monoxide sensor input terminal, and/or a fluid temperature sensor input terminal. The electronic circuit 12 is further configured to generate the actuator control signal further using one or more sensor values received on the one or more sensor signal input terminals 14 and/or attached auxiliary sensor signal input terminals 14, including an air temperature value, an air humidity value, a carbon dioxide value, a carbon monoxide value, and/or a fluid temperature value.

The electronic circuit 12 is thus configured to generate and apply the actuator control signal based on the measured current flow of fluid $\phi$, the command and control data received form the building control system 25 and/or the cloud-based computer system 3, and the sensor values received from one or more sensors connected to the sensor signal input terminals 14 and/or attached auxiliary sensor signal input terminals 14, for controlling the actuator 23 to actuate the valve 22 and regulate the flow of fluid $\phi$ in the HVAC fluid transportation system 2. For example, the electronic circuit 12 is configured to regulate the flow of fluid $\phi$ in the HVAC fluid transportation system 2 such as to reach a desired room temperature, defined in a setpoint in a user terminal, the building control system 25 or the cloud-based computer system 3, based on the current flow of fluid $\phi$, measured by the flow measurement system 11, and the actual room temperature value, received at the sensor signal input terminal 14 and/or attached auxiliary sensor signal input terminal 14 from a room temperature sensor.

The electronic circuit 12 is further configured to use the communication module 15 to transmit via the communication network 4 to the building control system 25 and/or the cloud-based computer system 3 operational HVAC data, such as the current measurement values provided by sensors connected to the sensor signal input terminal 14, for example, an air humidity value measured by a temperature sensor connected to the air temperature sensor input terminal, an air humidity value measured by an air humidity sensor connected to the air humidity sensor input terminal, a carbon dioxide value measured by carbon dioxide sensor connected to the carbon dioxide sensor input terminal, a carbon monoxide value measured by carbon monoxide sensor connected to the carbon monoxide sensor input terminal, and a fluid temperature measured by a temperature sensor T1, T2 connected to the fluid temperature sensor input terminal; and actuator data as described above including motor activity data and valve activity data.

The invention claimed is:

1. A flow control device (1) for an HVAC fluid transportation system (2), the flow control device (1) comprising:
a flow tube (10) formed in one piece;
flow measurement system (11) integrated with the flow tube (10) and configured to measure a volumetric flow of fluid ($\varphi$) through the flow tube (10); and
an electronic circuit (12) arranged in a fixed fashion on the flow tube (10) and connected electrically to the flow measurement system (11);
wherein the flow control device (1) further comprises a control signal output terminal (13) attached to the flow tube (10) and connected to the electronic circuit (12), and the electronic circuit (12) is configured to generate and apply on the control signal output terminal (13) an actuator control signal, using the volumetric flow of fluid ($\varphi$) measured by the flow measurement system (11), for an actuator (23), arranged outside the flow tube (10) of the flow control device (1), to actuate a valve (22) of the HVAC fluid transportation system (2),
wherein the flow control device (1) further comprises a (15) an actuator data input terminal (18) attached to the flow tube (10) and connected to the electronic circuit (12), and the electronic circuit (12) is further configured to generate the actuator control signal further using actuator data received on the actuator data input terminal (18), and
wherein the electronic circuit (12) is configured to determine an actuator type from an actuator identifier received in the actuator data input terminal (10), and to generate the actuator control signal using the actuator type.

2. The flow control device (1) of claim 1,
wherein the flow control device (1) further comprises one or more sensor signal input terminals (14) attached to the flow tube (10) and connected to the electronic circuit (12), and the electronic circuit (12) is further configured to generate the actuator control signal further using one or more sensor values received on the one or more sensor signal input terminals (14).

3. The flow control device (1) of claim 2, wherein the one or more sensor signal input terminals (14) include at least one of: an air temperature sensor input terminal, an air humidity sensor input terminal, a carbon dioxide sensor input terminal, a carbon monoxide sensor input terminal, and a fluid temperature sensor input terminal; and the electronic circuit (12) is further configured to generate the actuator control signal further using respectively at least one of: an air temperature value, an air humidity value, a carbon dioxide value, a carbon monoxide value, and a fluid temperature received on the one or more sensor signal input terminals (14).

4. The flow control device (1) of claim 1, wherein the electronic circuit (12) is configured to generate the actuator control signal using the volumetric flow of fluid ($\varphi$) measured by the flow measurement system (11) such as to maintain a set target value for the volumetric flow of fluid ($\varphi$).

5. The flow control device (1) of claim 1, wherein the electronic circuit (12) is configured to generate the actuator control signal to indicate at least one of: a motor position, a motor movement direction, a valve position, and a degree of opening of a valve orifice.

6. The flow control device (1) of claim 1, wherein the control signal output terminal (13) comprises at least one of: an antenna configured to wirelessly transmit the actuator control signal to the actuator (23), and a connector configured to set up a wired connection for applying the actuator control signal to the actuator (23).

7. The flow control device (1) of claim 1, wherein the flow control device (1) further comprises an antenna (19) configured to receive electromagnetic energy from an external mobile device for powering the electronic circuit (12) and the flow measurement system (11).

8. The flow control device (1) of claim 1, wherein the flow control device (1) further comprises a communication module (15) attached to the flow tube (10) and connected to the electronic circuit (12), and the electronic circuit (12) is configured to generate the actuator control signal further using a control command received by the communication module (15) via a communication network (4).

9. The flow control device (1) of claim 8, wherein the communication module (15) is configured to receive one or more control parameters via the communication network (4) from a cloud-based computer system (3), and the electronic circuit (12) is configured to generate the actuator control signal further using the one or more control parameters received from the cloud-based computer system (3).

10. The flow control device (1) of claim 9, wherein the communication module (15) is configured to receive with the one or more control parameters from the cloud-based computer system (3) at least one of: meteorological weather data, energy pricing information, room temperature information, and energy resource availability data; and the electronic circuit (12) is further configured to generate the actuator control signal further using respectively at least one of: meteorological weather data, energy pricing information, room temperature information, and energy resource availability data received from the cloud-based computer system (3).

11. The flow control device (1) of claim 9, wherein the communication module (15) is configured to transmit to the cloud-based computer system (3) one or more operational HVAC data values, including at least one of: the volumetric flow of fluid ($\varphi$) measured by the flow measurement system (11), an air temperature value, an air humidity value, a carbon dioxide value, a carbon monoxide value, a fluid temperature, motor activity data, and valve activity data.

12. The flow control device (1) of claim 1, wherein the wherein flow measurement system (11) comprises one or more pairs of ultrasound transceivers (110, 111) integrated into a wall (100) of the flow tube (10) and configured to transmit and receive ultrasound to and from a measurement path (112) inside the flow tube (10).

13. A flow control device (1) for an HVAC fluid transportation system (2), the flow control device (1) comprising:

a flow tube (10) formed in one piece;

flow measurement system (11) integrated with the flow tube (10) and configured to measure a volumetric flow of fluid ($\varphi$) through the flow tube (10); and an electronic circuit (12) arranged in a fixed fashion on the flow tube (10) and connected electrically to the flow measurement system (11);

wherein the flow control device (1) further comprises a control signal output terminal (13) attached to the flow tube (10) and connected to the electronic circuit (12), and the electronic circuit (12) is configured to generate and apply on the control signal output terminal (13) an actuator control signal, using the volumetric flow of fluid ($\varphi$) measured by the flow measurement system (11), for an actuator (23), arranged outside the flow tube (10) of the flow control device (1), to actuate a valve (22) of the HVAC fluid transportation system (2), and wherein the flow control device (1) further comprises a data communication bus (17) connecting at least one terminal receiver (16) to the electronic circuit (12), the at least one terminal receiver (16) being configured to receive and removably attach an auxiliary sensor signal input terminal (14) to the flow tube (10) and connecting the auxiliary sensor signal input terminal (14) to the electronic circuit (12), and the electronic circuit (12) is configured to generate the actuator control signal further using one or more sensor values received on the an auxiliary sensor signal input terminal (14).

\* \* \* \* \*